United States Patent [19]

Boyer

[11] Patent Number: 4,489,189

[45] Date of Patent: Dec. 18, 1984

[54] ALKANEDIYL BROMO-SUBSTITUTED ARYLENEDIYL CARBONATE POLYMERS

[75] Inventor: Nicodemus E. Boyer, Schaumburg, Ill.

[73] Assignee: PPG Industries, Inc., Pittsburgh, Pa.

[21] Appl. No.: 521,475

[22] Filed: Aug. 8, 1983

[51] Int. Cl.³ .............................................. C08G 63/62
[52] U.S. Cl. ................................... 524/409; 260/463; 524/411; 524/412; 525/67; 525/185
[58] Field of Search ................ 524/409, 411, 412; 525/67, 185; 260/463

[56] References Cited

U.S. PATENT DOCUMENTS

| | | | |
|---|---|---|---|
| 3,688,001 | 8/1972 | Exner et al. | 260/463 |
| 3,751,400 | 8/1973 | Crennan et al. | 260/47 XA |
| 3,763,644 | 10/1973 | Jackson et al. | 57/140 BY |
| 3,779,984 | 12/1973 | Exner et al. | 260/45.7 R |
| 3,823,175 | 7/1974 | Exner et al. | 260/463 |
| 3,846,469 | 11/1974 | Gunsher et al. | 260/463 |
| 3,855,277 | 12/1974 | Fox | 260/45.7 R |
| 3,912,687 | 10/1975 | Haupt et al. | 260/47 XA |
| 4,104,264 | 8/1978 | Dixon et al. | 528/370 |
| 4,122,112 | 10/1978 | Koda | 260/463 |
| 4,235,978 | 11/1980 | Luce et al. | 525/101 |
| 4,286,085 | 8/1981 | Jaquiss et al. | 528/199 |
| 4,286,086 | 8/1981 | Mark | 528/199 |
| 4,301,062 | 11/1981 | Yamashita et al. | 260/45.75 B |

FOREIGN PATENT DOCUMENTS 697041 11/1964 Canada .
2228257 1/1973 Fed. Rep. of Germany .

OTHER PUBLICATIONS

Godt et al., "Derivatives of 4,4'-Isopropylidenebis(2,6-Dichlorophenol)", *Journal of Chemical and Engineering Data*, vol. 12, No. 2 (Apr. 1967), pp. 252–254.

*Primary Examiner*—Maurice J. Welsh
*Attorney, Agent, or Firm*—George D. Morris

[57] ABSTRACT

Carbonate polymer contains both divalent aromatic groups substituted by at least two bromo groups and at least one divalent aliphatic group. The presence of the divalent aliphatic group or groups reduces the melting range of the carbonate polymer. The carbonate polymer is fire resistant and may be admixed with flammable polymer to provide a composition having greater fire resistance than that of the flammable polymer.

17 Claims, No Drawings

ALKANEDIYL BROMO-SUBSTITUTED ARYLENEDIYL CARBONATE POLYMERS

Aromatic carbonate polymers containing significant numbers of bromo groups are fire resistant and it is often desired to blend such polymers with flammable polymers to impart fire resistance to the resulting composition. A major problem which has arisen is that the melting range of many bromine-containing aromatic carbonate polymers having desirable fire resistance is often much higher than the flammable polymers with which they are to be blended. If blending and subsequent molding are performed while the flammable polymer is in the molten state but the fire resistant polymer is not, lack of substantial homogeneity is often the result. In many cases the cooled product is rather analogous to grains of sand distributed in a solid matrix. An alternative is to increase the temperature to at least the melting range of the fire resistant polymer, but this consumes energy, is expensive, and often leads to degradation of the flammable polymer.

It has now been found that by incorporating a minor proportion of divalent aliphatic groups into the bromine-containing aromatic carbonate polymers, the melting range may be substantially reduced. In many cases, the reduction amounts to about 200 Celsius degrees as compared to similar polymer without the aliphatic groups.

Accordingly, one aspect of the present invention is fire resistant carbonate polymer diagrammatically represented by the formula

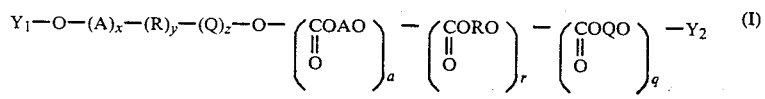

wherein
a. each A is (1-methylethylidene)bis(2,6-dibromo-4,1-phenylene),
b. each R is 1,2-ethanediyl,
c. each Q is individually a divalent organo group, other than A or R, having at least two carbon atoms between the two valences thereof,
d. $Y_1$ of each molecule of the carbonate polymer is independently hydrogen or

where $Y_3$ is a monovalent organo group,
e. $Y_2$ of each molecule of the carbonate polymer is independently hydrogen or

where $Y_4$ is a monovalent organo group,
f. The average value of each of x, y, and z is in the range of from 0 to 1,
g. the sum of the average values of a and x is in the range or from 2 to about 8,
h. the sum of the average values of r and y is in the range of from 1 to about 8,
i. the sum of the average values of q and z is in the range of from 0 to about 8,
provided that
j. the sum of the average values of x, y and z is 1,
k. the sum of the average values of a and x is greater than the sum of the average values of r and y, and
l. the sum of the average values of a and x is greater than or equal to the sum of the average values of q and z.

Formula I is diagrammatic, and it is not intended to imply that the three right-most parenthetical portions are necessarily blocks, although blocks may be used where desired. In many cases the polymer is more or less random, especially when more than a few mer units are employed and when mixtures of alcohols, phenols, and/or mixtures of haloformates are used in the carbonate-forming reaction. In those instances where more than a few mer units are used and it is desired to form blocks, prepolymers are typically first formed and these are then joined in a carbonate-forming reaction. By the judicious choice of reactants, carbonate polymer having an alternating structure or blocks of alternating structure may be formed.

Although the values of a, r and q will each be an integer for any particular compound, the average values of these quatities for mixtures of compounds may be whole or fractional numbers consistent with the ranges and provisions indicated above. Similarly, one of x, y and z will be one and the others will be zero for any particular compound, but the average values of these quantities for mixtures of compounds may be whole or fractional numbers in the ranges stated above, provided their sum is unity. In other words, while the three left-most parenthetical portions of Formula I are especially convenient for representing mixtures of compounds, they are represented diagrammatically and in no individual compound will these portions be connected directly together.

The average values of a, r, q, x, y and z may be ascertained from analytical information, knowledge of the structures of the reactants, knowledge of the proportions of reactants, knowledge of the reaction mechanism, knowledge of the reaction procedure, or various combinations of these. When an average molecular weight of the composition is used in the determination, the number average molecular weight should be employed.

In some instances it may be desired to include in minor amount in the polymer molecule one or more bivalent organo groups other than those represented by A or R of Formula I. Accordingly the bivalent organo groups which may be used for Q may be widely varied. Each may be substituted or unsubstituted. All of the bivalent organo groups used for Q in the molecule may be the same, they may be different or some may be the same and different from the others. Typically the divalent organo groups used each contain from about 6 to about 30 carbon atoms. From about 6 to about 15 carbon atoms is preferred.

In one embodiment, the divalent organo groups used for Q may be divalent aromatic groups (1) containing a single aromatic ring which is not substituted by at least two bromo groups, or (2) containing two aromatic rings which are either joined together or separated by an atom wherein either or both of the aromatic rings of the two-ring group do not possess at least two bromine atoms. Examples of such divalent organo groups include 1,2-phenylene, 1,3-phenylene, and 1,4-phenylene.

In another embodiment, the divalent organo groups employed for Q may be divalent aromatic groups containing three or more aromatic rings. Examples include (phenylmethylene)bis(4,1-phenylene), (2-chlorophenyl-methylene)-bis(4,1-phenylene), 2,4-dichlorophenylmethylene)bis-(4,1-phenylene), [4-(1-methylethyl)phenylmethylene]bis(4,1-phenylene), (1-naphthalenylmethylene)bis-(4,1-phenylene), (1-phenylethylidene)bis-(4,1-phenylene), [1-(4-chlorophenyl)ethylidene]bis(4,1-phenylene), [1-(2,5-dichlorophenyl)ethylidene]bis(4,1-phenylene), [1-(2,5-dibromophenyl)ethylidene]bis(4,1-phenylene), [1-(3,4-dichlorophenyl)ethylidene]bis(4,1-phenylene), [1-(2-naphthalenyl)ethylidene]bis(4,1-phenylene), [diphenylmethylene]bis(4,1-phenylene) and (1,1'-biphenyl-4,4'-diyl)bis(oxy-4,1-phenylene).

In yet another embodiment, the divalent organo groups employed for Q may be used to introduce divalent linkage of various types such as for example, ester, amide, urethane or urea linkages, to the molecule. Divalent organo groups containing one or more than one type of such divalent linkage may be used as desired. Examples of divalent organo groups which may be used for Q include (carbonyloxy)bis(2,1-ethanediyl), (carbonyldiimino)bis(methylene), (2,3,4,5-tetrahydro-2-oxo-1H-imidazol-1,3-diyl)bis(methylene), methylenebis(4,1-cyclohexanediyl-N-carbamyl-2,1-ethanediyl), and (6-methyl-1,4-phenylene)bis(N-aminocarbonyl-2,1-ethanediyl). Still others include those derived from polyester oligomers, polyamide oligomers, polyurethane oligomers, polyurea oligomers and poly(urethane-urea) oligomers, as for instance, 4,8-dioxo-3,7-dioxadecane-1,10-diyl.

The terminal groups $Y_3$ and $Y_4$ may each be any of a wide variety of monovalent organo groups. $Y_3$ and $Y_4$ may be the same or different, but usually they are the same. Examples of terminal groups that may be used include alkyl, alpha,beta-saturated alkenyl, aralkyl, (cycloalkyl)alkyl, cycloalkyl, aryl, alkoxyalkyl and aryloxyalkyl. When alkyl is employed, it usually has from 1 to about 20 carbon atoms, often from 1 to about 10 carbon atoms. Lower alkyl having from 1 to about 4 carbon atoms is preferred. Methyl and ethyl are especially preferred. The alpha,beta-saturated alkenyl used generally has from 3 to about 10 carbon atoms; allyl is preferred. When aralkyl is employed, the aryl portion generally contains from 6 to about 10 carbon atoms and the alkyl portion usually contains from 1 to about 10 carbon atoms; benzyl is preferred. When (cycloalkyl)alkyl is used, the cycloalkyl portion generally contains from about 6 to about 8 carbon atoms and the alkyl portion typically contains from 1 to about 10 carbon atoms; cyclohexylmethyl is preferred. The cycloalkyl typically has from about 6 to about 8 carbon atoms; cyclohexyl is preferred. The aryl usually has from 6 to about 10 carbon atoms; 1-naphthyl, 2-naphthyl, and phenyl are preferred. When alkoxyalkyl is employed the alkoxy portion usually contains from 1 to about 4 carbon atoms and the alkyl portion usually contains from 1 to about 10 carbon atoms. When aryloxyalkyl is used, the aryloxy portion generally contains from about 6 to about 10 carbon atoms and the alkyl portion typically contains from 1 to about 10 carbon atoms. Those groups having one or more rings are usually homocyclic, but one or more hetero atoms may be present so long as they do not render the carbonate polymer unsuitable for its intended purpose. The aliphatic groups and the aliphatic portions of hybrid groups such as aralkyl may be straight or branched, but is is preferred they be straight.

The groups used for $Y_3$ and $Y_4$ may be unsubstituted or either or both may be substituted with one or more substituents which do not render the carbonate polymer unsuitable for its intended purpose. When a plurality of substituents are used, they may be the same or all or a portion of them may be different. It is preferred that they be substituted with one or more halo groups. Chloro and bromo are preferred; bromo is especially preferred. The especially preferred terminal groups are pentabromophenyl and 2,4,6-tribromophenyl. Others of particular interest include tetrabromo-1-naphthyl, pentabromo-1-naphthyl, hexabromo-1-napthyl, tetrabromo-2-naphthyl, pentabromo-2-napthyl, and hexabromo-2-naphthyl.

In Formula I, the sum of the average values of a and x is preferably in the range of from 2 to about 6, the sum of the average values of r and y is preferably in the range of from 1 to about 6, and the sum of the average values of q and z is preferably in the range of from 0 to about 6. It is particularly preferred that the sum of the average values of q and z in Formula I be essentially zero.

The number average molecular weights of the carbonate polymers of the invention may vary widely within the range provided by Formula I. Usually, however, the number average molecular weight is in the range of from about 650 to about 30,000. Often it is in the range of from about 766 to about 8000. From about 766 to about 4000 is preferred.

The carbonate polymers of the invention may be prepared by many methods. Usually they are conveniently prepared by reacting hydroxy-functional compounds with carbonic dihalide, by reacting one or more hydroxy-functional compounds with one or more haloformate-functional compounds, or by reacting one or more hydroxy-functional compounds with one or more haloformate-functional compounds and carbonic dihalide. Ordinarily the reactions are carried out in the liquid phase.

In the exemplary methods described below, A, R, Q, $Y_1$, $Y_2$, $Y_3$, $Y_4$, x, y, z, a, r, and q are as discussed above with respect to Formula I. Mixtures of compounds within any of the formulae below may be used when desired.

According to one method, diols represented by the formulae

HO—A—OH     (II)

HO—R—OH     (III)

and, when used,

HO—Q—OH     (IV)

are reacted with carbonic dihalide represented by the formula

(V)

where $X_1$ and $X_2$ are each independently halo. Examples of carbonic dihalides that may be employed include phosgene, bromophosgene and bromochlorophosgene; phosgene is preferred. Only one carbonic dihalide or a mixture of carbonic dihalides may be used as desired. In one variation of this method a stoichiometric deficiency of carbonic dihalide is employed and the carbonate polymer is terminated with hydroxyl groups. In another variation, a stoichiometric excess of carbonic dihalide is employed and the resulting terminal haloformate groups are then converted to hydroxyl groups by reaction with water. In still another variation, monohydroxy-functional compounds represented by the formulae $$Y_3\text{—OH} \quad \text{(VI)}$$

and $$Y_4\text{—OH} \quad \text{(VII)}$$

are included with the diols prior to reaction with carbonic dihalide. In this variation a stoichiometric amount or an excess of carbonic dihalide is generally employed, although a slight deficiency may be used. Residual haloformate functionality, if any, may be reacted with water.

In another method, diols of Formula II, Formula III and, when used, Formula IV are reacted with carbonic dihalide of Formula V to form a diol prepolymer represented by Formula I where $Y_1$ and $Y_2$ are hydrogen. The diol prepolymer is then reacted with monohaloformate-functional compounds represented by the formulae

(VIII)

and

(IX)

where X is halo, to convert some or all of the hydroxyl functionality to

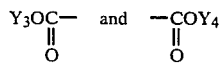

groups. For individual molecules of the monohaloformate-functional compounds, X is usually chloro or bromo.

In still another method, diols of Formula II, Formula III and, when used, Formula IV are reacted with carbonic dihalide of Formula V to form a bishaloformate prepolymer represented by the formula

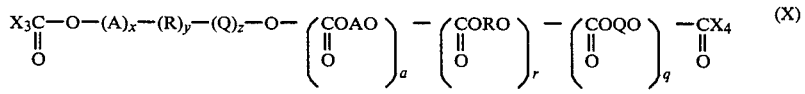
(X)

where $X_3$ and $X_4$ are each independently halo. Usually $X_3$ and $X_4$ are each independently chloro or bromo. The prepolymer may then be reacted with the monohydroxy functional compounds of Formula VI and Formula VII.

In yet another method, compounds represented by the formulae $$Z_1\text{—O—A—O—}Z_1 \quad \text{(XI)}$$

$$Z_2\text{—O—R—O—}Z_2 \quad \text{(XII)}$$

and, when used, $$Z_3\text{—O—Q—O—}Z_3 \quad \text{(XIII)}$$

where (a) when compound of Formula XIII is used, at least one of $Z_1$, $Z_2$ and $Z_3$ is hydrogen, another is halocarbonyl and the third is hydrogen or halocarbonyl, and (b) when compound of Formula XIII is not used, one of $Z_1$ and $Z_2$ is hydrogen and the other is halocarbonyl to form polymer of Formula I wherein $Y_1$ and $Y_2$ are hydrogen or prepolymer of Formula X, depending upon which reactant is in excess. The polymer of Formula I wherein $Y_1$ and $Y_2$ are hydrogen may be the final product, or it may be reacted with the monohaloformate-functional compounds of Formula VIII and Formula IX. The prepolymer of Formula X may be reacted with water, the monohydroxy-functional compounds Formula VI and Formula VII, or mixtures of water and the monohydroxy-functional compounds. The variation of this method wherein compound of Formula XIII is not used, is especially advantageous when it is desired that the carbonate polymer have A and R, separated by carbonate groups, alternating in the structure.

Block carbonate polymer is prepared by forming one or more blocks, each having dihydroxy or bishaloformate functionality, joining these blocks in one or more carbonate forming reactions to form polymer of Formula I wherein $Y_1$ and $Y_2$ are hydrogen or prepolymer of Formula X, depending upon which functionality is in excess in the blocks employed. The polymer of Formula I wherein $Y_1$ and $Y_2$ are hydrogen may be the final product, or it may be reacted with the monohaloformate-functional compounds of Formula VIII and Formula IX. The prepolymer of Formula X may be reacted with water, the monohydroxy-functional compounds of Formula VI and Formula VII, or mixtures of water and the monohydroxy-functional compounds. There are a multitude of variations of this general process which can be used to produce carbonate polymers having blocks of various identities. Depending upon details of the procedure employed, the carbonate polymer may contain substantially only blocks or it may contain blocks interspersed with one or more sections of random polymer. The blocks may contain only one basic skeleton, viz., A, R or Q, separated by carbonate groups, or they may contain more than one such skeleton so separated.

In one variation, a bishaloformate-functional block is prepared by reacting the desired diol with an excess of carbonic dihalide. This block is then reacted with other desired diol (which may be monomeric diol or dihydroxy-functional block formed by reacting monomeric diol with a deficiency of carbonic dihalide) to form polymer of Formula I wherein $Y_1$ and $Y_2$ are hydrogen or prepolymer of Formula X. This may then be dealt with as described in the immediately preceding paragraph.

In another variation, a dihydroxy-functional block is prepared by reacting the desired diol with a deficiency of carbonic dihalide. This block is then reacted with the desired bishaloformate (which may be either monomeric bishaloformate or bishaloformate-functional block) to form polymer of Formula I wherein $Y_1$ and $Y_2$ are hydrogen or prepolymer of Formula X. This may then be dealt with as described above.

In yet another variation, one dihydroxy-functional block and at least one other dihydroxy-functional block or monomeric diol is reacted with carbonic dihalide to form polymer of Formula I wherein $Y_1$ and $Y_2$ are hydrogen or prepolymer of Formula X. This may be dealt with as previously described.

The reaction temperatures may be widely varied. In general, haloformate-functional compounds are formed from hydroxyl-functional compounds and carbonic dihalide ordinarily using temperatures in the range of from about $-20°$ C. to about 220° C.; from about $+20°$ C. to about 120° C. are preferred. Carbonate-forming reactions are typically conducted using temperatures in the range of from about $+20°$ C. to about 240° C.; from about 60° C. to about 190° C. is preferred.

In the haloformate-forming reactions, the carbonic dihalide is generally used at least in stoichiometric amount or in excess. Typically the equivalent ratio of the carbonic dihalide to the hydroxy-functional compounds is in the range of from 1:1 to about 10:1; from about 1.1:1 to about 5:1 is preferred.

In the carbonate-forming reactions, the reactants may be employed in about stoichiometric amounts, or some of them may be used in excess. In the formation of carbonate prepolymers, the terminal functionality of the prepolymer is primarily governed by which reactants are in excess. In forming the final carbonate polymer, it is usually preferred to use an excess of hydroxy-functional compound or carbonic dihalide rather than to use an excess of haloformate-functional compound, although an excess of haloformate-functional compound may be employed.

When carbonic dihalide is used in excess over the hydroxy-functionality present in any of the carbonate-forming reactions, the equivalent ratio of the carbonic dihalide to the hydroxy-functional compounds is usually ultimately in the range of from just above 1:1 to about 10:1, from just above 1:1 to about 5:1 is preferred.

When hydroxy-functional compound is used in excess over the haloformate functionality present in any of the carbonate-forming reactions, the equivalent ratio of the hydroxy-functional compounds to the haloformate-functional compounds is usually ultimately in the range of from just above 1:1 to about 5:1, from just above 1:1 to about 2:1 is preferred.

When haloformate-functional compound is used in excess over the hydroxyl-functionality present in any of the carbonate-forming reactions, the equivalent ratio of the haloformate-functional compounds to the hydroxy-functional compounds is usually ultimately in the range of from just above 1:1 to about 5:1; from just above 1:1 to about 2:1 is preferred.

Each of the various reactions described above is ordinarily conducted at or near ambient atmospheric pressure, although greater or lesser pressures may be used where desired.

The reactions may conveniently be conducted in extrinsic organic solvent. Ordinarily, one or more scavengers of hydrogen halide are also present. Some scavengers may also act as catalysts for the reaction and may be regenerated on heating by evolution of hydrogen halide.

Exemplary scavengers which may be used are nitrogen-containing heterocyclic organic compounds such as pyridine, imidazole, 2,6-lutidine, 2,4,6-collidine, and di(methylamino)pyridine. Non-heterocyclic nitrogen-containing aromatic scavengers such as dimethylaniline are also useful. Nitrogen-containing aliphatic compounds such as triethylamine may be employed as scavengers, as may inorganic bases such as sodium hydroxide, potassium hydroxide, sodium carbonate and potassium carbonate. Mixtures of scavengers may be used where desired. The preferred scavenger is pyridine.

The amount of scavenger employed is subject to wide variation. Normally the equivalent ratio of the scavenger to haloformate and/or carbonic dihalide is in the range of from about 0.0001:1 to about 100:1. Typically it is in the range of from about 0.0005:1 to about 20:1. It is preferred that the equivalent ratio be in the range of from about 0.001:1 to about 1:1.

Substantially any extrinsic solvent or mixture of solvents may be used so long as they are either inert to, or do not form detrimental reaction products with, the reactants and the desired reaction products at the reaction temperature and below. Examples of suitable solvents are the aromatic hydrocarbon solvents such as benzene, toluene, and xylene. Chlorinated aliphatic solvents such as methylene chloride, chloroform, perchloroethylene, trichloroethylene and carbon tetrachloride may be used. Similarly chlorinated aromatic solvents such as chlorobenzene, o-dichlorobenzene and o-chlorotoluene are useful. The preferred extrinsic solvent is toluene.

The weight ratio of extrinsic solvent to the reactants ultimately employed is subject to wide variation. Generally, the amount of solvent should be sufficient to at least partially dissolve the reactants at the reaction temperature. The weight ratio of extrinsic solvent to the reactants ultimately employed is usually in the range of from about 0.5:1 to about 100:1. From about 2:1 to about 20:1 is preferred.

The carbonate polymers of the invention may be incorporated with flammable polymer to provide a composition having greater fire resistance than that of the flammable polymer. The individual carbonate polymers of the invention will be more effective with some flammable polymers than with others, but the desired effect can be obtained by proper adjustment of the fire resistant carbonate polymer concentration in the composition. Usually the flammable polymer is thermoplastic, but it may be thermosetting. The flammable polymer may be a homopolymer, an interpolymer or a mixture of polymers. Examples of flammable polymers in which the fire resistant polymer of the invention may be used include acrylonitrile-butadiene-styrene interpolymer or graft polymer, polystyrene, high density polyethylene, low density polyethylene, polypropylene, polyesters, and polycarbonates. The preferred polymers are acrylonitrile-butadiene-styrene interpolymer or graft polymer, high impact polystyrene and high density polyethylene.

The amount of the fire resistant carbonate polymer which is present in compositions of the invention is subject to wide variation. Such fire resistant carbonate polymer is ordinarily present in an amount in the range of from about 2 percent to about 30 percent by weight of the total polymeric content of the composition. From about 5 percent to about 20 percent by weight is preferred. Mixtures of fire resistant carbonates may be used.

One or more other materials which increase fire resistance may optionally also be present in the composition. Examples of such materials include zinc oxide, zinc borate, boric acid, borax, ferric oxide, antimony trioxide and antimony pentoxide. Antimony trioxide is preferred. Mixtures may be employed where desired. The amounts of these materials are also subject to wide variation. When used, they are usually present in the composition of the invention in an amount in the range of from about 0.1 to about 15 percent by weight. An amount in the range of from about 1 percent to about 10 percent by weight is preferred.

dibromo-4-hydroxyphenyl)propane, 900 milliliters of toluene and 31.64 grams (0.4 mole) of pyridine. The temperature increased from 25° C. to 28° C. spontaneously as the charged materials were agitated and the diol went into solution. Over a period of 1 hour, while the temperature was in the range of 29° C. to 39° C., 40.2 grams (0.2 mole) of 1,2-ethanediylbis(chloroformate) of about 93% purity was added dropwise to the reaction mixture. The reaction was exothermic, and after the addition of about one-fourth of the 1,2-ethanediylbis(chloroformate) when the temperature was 39° C., external cooling by a cold water bath was applied to keep the temperature below 36° C. for the remainder of the addition. Upon completion of the addition, 50 milliliters of toluene was added through the addition funnel. The cooling bath was then replaced by an electric heating mantle. The reaction mixture was heated to reflux (112° C.), maintained at reflux for 80 minutes and then allowed to cool to ambient temperature over the weekend. The resulting product had a volume of 1100 milliliters and contained a white precipitate. The oligomer dissolved in the liquid phase was identified as being principally:

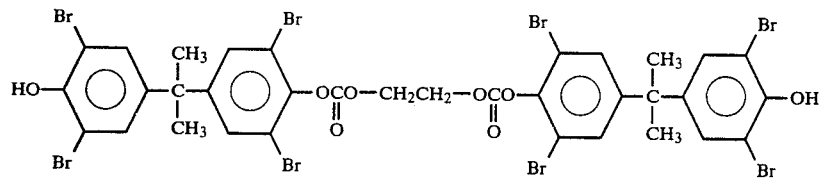

The compositions of the invention may optionally contain plasticizers, pigments, dyes, tints, resinous pigment dispersants or grinding vehicles, and the like.

The listing of optional ingredients discussed above is by no means exhaustive. These and other ingredients may be employed in their customary amounts for their customary purposes so long as they do not seriously interfere with good polymer formulating practice.

The composition of the invention are usually prepared by simply admixing the various ingredients. This may be accomplished in many instances by milling. If the flammable polymer and the fire resistant polymer are both soluble in solvent, they may be dissolved, mixed, and the polymer mixture recovered by removal of the solvent. Most often, the materials are admixed while the polymers are in the form of a melt.

The compositions of the invention have fire resistance characteristics and find many uses. Typically, they may be extruded into fibers, films or other shapes, or molded, shaped or formed into substantially any form. Where the polymers of the composition are soluble in solvent or are dispersible in liquid nonsolvents such as water, organic nonsolvent or miscible systems of water and organic liquid, the composition may be employed in coating compositions.

In the illustrative examples which follow, all parts are parts by weight and all percentages are percentages by weight unless otherwise specified.

The precipitate was identified as being higher oligomer of similar structure.

EXAMPLE II

This example illustrates a synthesis of pentabromophenyl chloroformate.

A 5 liter, four-necked flask equipped with an agitator, a thermometer, an isopropanol and solid carbon dioxide cooled reflux condenser, a tube for the introduction of gaseous phosgene and an electric heating mantle was charged with 2443.1 grams (5.0 moles) of pentabromophenol, 5.0 grams (0.07 mole) of imidazole and 7500 milliliters of diethyl carbonate. The charged materials were heated while gaseous phosgene was added at the rate of 8 grams per minute. The phosgene addition was begun while the temperature of the reaction mixture was at room temperature, and concluded when the temperature was 105° C. and 611.2 grams (6.17 moles) of phosgene had been added. The reaction mixture was then maintained at 90° C. for 1 hour, and thereafter allowed to cool overnight to room temperature. On the next day the reaction mixture was heated to 90° C. and maintained at temperatures in the range of from 90° C. to 96° C. for 8 hours while 171.3 grams (1.73 moles) of phosgene was added. The reaction mixture was then allowed to cool overnight to room temperature. On the following day the reaction mixture was briefly heated to 110° C. A clear, yellow solution was observed. A small aliquot was removed by a pipet and analyzed by liquid chromatography. The results showed that of the total dissolved solids in the solution, the relative percentages by weight of pentabromophenyl chloroformate and pentabromophenol were 87.7% and 1.8% respectively. The isopropanol and solid carbon dioxide cooled condenser was replaced with a water cooled

EXAMPLE I

This example illustrates a synthesis of an oligomeric, carbonate functional diol.

A 2-liter, 4-necked flask equipped with a mechanical agitator, a thermometer, a vertical water-cooled condenser topped by a drying tube containing anhydrous calcium sulfate and an addition funnel for liquids, was charged with 217.6 grams (0.4 mole) of 2,2-bis(3,5- condenser. Excess phosgene was purged by a stream of nitrogen which was bubbled through the reaction mixture for 8 hours while the reaction mixture was heated to the reflux temperature of diethyl carbonate. The nitrogen stream was terminated and 3000 milliliters of solvent was removed by distillation. Another small aliquot was removed and analyzed by liquid chromatography. The results showed that of the total dissolved solids in the solution, the relative percent by weight of pentabromophenyl chloroformate was 86.8% and the relative percent by weight of pentabromophenol was 1.6%.

The reaction mixture was allowed to cool to room temperature overnight whereupon a first crop of solids precipitated as a fine, white solid. The first crop was collected by filtration and dried in a vacuum oven for 3 hours at 70° C. and an absolute pressure of 0.5 Torr to yield 2033.0 grams of dry, white powder having a melting range of 80° C. to 102° C.

Differential scanning calorimetric analysis of the first crop at a heating rate of 10° C./minute in a flowing nitrogen atmosphere showed a melting point of 116° C. and decomposition at approximately 300° C. Gas chromatography showed the first crop to contain 0.08 percent by weight diethyl carbonate. The first crop was analyzed for bromine and chlorine. Calculated for $C_7Br_5ClO_2$: 72.50% Br, 6.43% Cl. Found: 70.10% Br, 69.90% Br, 6.25% Cl, 6.18% Cl. Average Found: 70.00% Br, 6.22% Cl. Purity was determined as follows: based on bromine content, 96.55%; based on chlorine content, 96.73%; based on liquid chromatography, 93.3 relative percent. According to liquid chromatography there was also present 3.1 relative weight percent bis(pentabromophenyl) carbonate. According to infrared spectroscopy, the first crop had the structure of pentabromophenyl chloroformate with no discernible impurities present; there was less than 0.02% hydroxyl present.

The filtrate from the first crop was concentrated in a flash evaporator to a volume of 1400 milliliters. This was filtered to recover a second crop of white solid. The second crop was dried in a vacuum oven for 8 hours at 70° C. and an absolute pressure of 0.5 Torr to yield 453.2 grams of an off-white solid. The pentabromophenyl chloroformate purity of the second crop was 88.5 percent by chloroformate titration and 86.6 relative percent by liquid chromotography.

EXAMPLE III

This example illustrates a synthesis of an oligomeric carbonate.

A 2-liter, 4-necked flask equipped with a mechanical agitator, a thermometer, a vertical water-cooled condenser topped with a drying tube containing anhydrous calcium sulfate, an addition funnel for solids and an electric heating mantle, was charged with 1060 milliliters of the two-phase reaction product of Example I. While the temperature of the charged material was initially at 87° C., 227.7 grams of the first crop product of Example II was added over a period of 20 minutes. Thereafter, 80 milliliters of toluene was added through the addition funnel. Upon completion of the toluene addition, the temperature was 77° C. The reaction mixture was heated over a period of 80 minutes from 77° C. to 104° C. and then allowed to cool to ambient temperature overnight.

The reaction mixture was then heated to reflux (111° C.) and maintained at this temperature for 4½ hours. A 20 milliliter aliquot was removed and the remaining reaction mixture was maintained at reflux for an additional 3 hours and then admixed with 2.2 liters of methanol to precipitate a solid. After standing overnight at ambient temperature in a covered beaker, the solid was recovered by filtration, blended with 2 liters of methanol in a Waring blender and again recovered by filtration. The wet solid was then dried, first at 160° C. and 67 pascals, absolute, for 8 hours, and then at 120° C. and 67 pascals, absolute, for 17 hours to yield 365.3 grams of product. The product was analyzed for bromine and chlorine. Found 63.15%, 63.62% Br; <0.1% Cl. Infrared spectrographic analysis showed the product to contain 0.19% OH. Thermogravimetric analysis in a flowing nitrogen atmosphere at a heating rate of 10° C./minute indicated a 1 percent weight loss at 309° C., a 5 percent weight loss at 344° C. and an 8 percent weight loss at 358° C. The product melted in the range of 180° C. to 193° C. Nuclear magnetic resonance spectroscopy and infrared spectroscopy confirmed the product as being an oligomeric carbonate. According to liquid chromatography, the number average molecular weight, the weight average molecular weight, and the z-average molecular weight were 1550, 1967, and 2705, respectively.

EXAMPLE IV

This example illustrates a synthesis of an oligomeric carbonate.

A 5-liter, 4-necked flask equipped with a mechanical agitator, a thermometer, a vertical condenser cooled by solid carbon dioxide and acetone and topped by a drying tube containing anhydrous calcium sulfate, a glass gas-introduction tube and an electric heating mantle was charged with 870.2 grams (1.6 moles) of 2,2-bis(3,5-dibromo-4-hydroxyphenyl)propane, 3.2 grams (0.04 mole) of pyridine and 2500 milliliters of toluene. The charged materials were heated and at 40° C. the addition of phosgene at a rate of 6.5 grams per minute was begun. The temperature of the reaction mixture was increased to 80° C. After 398.2 grams (4.02 mole) of phosgene had been added, the addition was discontinued and the temperature of the reaction mixture was raised to 90° C. A further 77.0 grams (0.78 mole) of phosgene was added. The temperature of the reaction mixture was then held at 90° C. for 1½ hours, raised to 95° C. and held at 95° C. for 1 hour. The reaction mixture was allowed to cool to room temperature. After standing over the weekend, the reaction mixture was heated to 95° C. and a further 46.8 grams (0.47 mole) of phosgene was added. The reaction mixture was held at 95° C. for 1 hour. The temperature was then increased to 100° C. where it was held for 30 minutes. A sublimate of pyridine hydrochloride was observed on the cooler parts of the flask. The condenser was replaced by a vertical water-cooled condenser. The reaction mixture was heated to reflux and a stream of nitrogen was introduced through the gas introduction tube for 1½ hours. A 50 milliliter aliquot was removed. To the remaining reaction mixture was added 49.7 grams (0.8 mole) of 1,2-ethanediol. The reaction mixture was heated at reflux for 2½ hours and then a 50 milliliter aliquot was removed. The remaining reaction mixture was cooled below reflux and 762.3 grams (1.56 moles) of pentabromophenol was added. The reaction mixture was heated to reflux, held at reflux for 2 hours, and allowed to cool to room temperature. After standing overnight, the reaction mixture was heated to reflux and held for 5 hours, by the end of which time the evolution of hydrogen chloride had ceased. Reflux was terminated and the contents of the flask were poured in equal portions into two 4-liter beakers. Methanol was added to each beaker in a 2:1 volumetric ratio, basis the reaction mixture in the beaker. A viscous brown mass precipitated. Most of the liquid was removed by decantation and 2 liters of fresh methanol was added to each beaker. After standing overnight, it was observed that the viscous mass had hardened. The hardened mass from each beaker was ground in a large Waring blender with 2 liters of methanol and separated from the liquid by filtration. The two portions of filtered solids were combined in the blender and ground with 2 liters of fresh methanol. The solids were separated from the liquid by filtration, dried in a vacuum oven at 80° C. for 12 hours, at 120° C. for 18 hours, and at 140° C. for 6 hours. During drying at 140° C. the solid partially melted. The solid was ground in a mortar and sieved to yield 1502.3 grams of product which melted in the range of 163° C. to 175° C. The product was analyzed for bromine. Found: 65.11%, 65.17% Br. Average Found: 65.14% Br. Thermogravimetric analysis in a flowing nitrogen atmosphere at a heating rate of 10° C./minute indicated a 1 percent weight loss at 246° C., a 5 percent weight loss at 373° C., and an 8 percent weight loss at 390° C. By differential scanning calorimetry in a flowing nitrogen atmosphere at a heating rate of 10° C./minute, decomposition of the product began at 360° C. Infrared spectroscopy indicated the product contained only a trace (0.03%) of hydroxyl groups. According to liquid chromatography, the number average molecular weight, the weight average molecular weight, and the z-average molecular weight were 1366, 1678, and 2125, respectively. Nuclear magnetic resonance spectroscopy and infrared spectroscopy confirmed the product as being an oligomeric carbonate.

EXAMPLE V

This example illustrates a synthesis of an oligomeric carbonate.

A 2-liter, 4-necked flask equipped with a mechanical agitator, a thermometer, a vertical condenser cooled by solid carbon dioxide and acetone and topped by a drying tube containing anhydrous calcium sulfate, a glass gas-introduction tube and an electric heating mantle was charged with 435.2 grams (0.8 mole) of 2,2-bis(3,5-dibromo-4-hydroxyphenyl)propane, 900 milliliters of toluene and 2.0 grams (0.0253 mole) of pyridine. Beginning at 25° C., 232.3 grams (2.35 moles) of phosgene was introduced below the surface of the liquid via the gas introduction tube at the fastest rate permitted by the equipment while the temperature of the reaction mixture was increased from 25° C. to 80° C. Upon completion of the addition the reaction mixture was held at 80° C. for 1 hour, at 85° C. for 1 hour, at 90° C. for 1 hour, and at 100° C. for 1 hour. The condenser was replaced by a vertical water-cooled condenser and a stream of nitrogen was introduced through the gas introduction tube for 1 hour to remove excess phosgene. The reaction mixture was then brought to reflux and 24.8 grams (0.4 mole) of 1,2-ethanediol was added. Upon completion of the addition, the reaction mixture was heated at reflux for 1 hour, at the end of which time evolution of hydrogen chloride had ceased and a sublimate of pyridine hydrochloride was observed in the cooler parts of the flask. The reaction mixture was then cooled below reflux temperature. The reaction mixture contained an oligomeric carbonate-functional bischloroformate. While the reaction mixture was below reflux temperature, 264.6 grams (0.8 mole) of 2,4,6-tribromophenol was added. The reaction mixture was then heated to reflux and held at reflux for 3 hours at the end of which time the evolution of hydrogen chloride had ceased and a sublimate of pyridine hydrochloride was observed in the cooler parts of the flask. A Dean Stark trap was attached and 800 milliliters of solvent was removed. The brown, viscous oily liquid remaining in the flask was poured while hot into a 4-liter beaker. Steam was introduced through a tube into the liquid in the open beaker. When about 2.5 liters of water had collected in the beaker, the introduction of steam was terminated. A fine, white solid was observed in the beaker together with the water. The contents of the beaker were filtered. The filtered solids were washed in a Waring blender with 500 milliliters of water, filtered, washed again in the Waring blender with another 500 milliliters of water and again filtered. The solids were then washed with 800 milliliters of methanol, filtered, dried in an air oven at 85° C. for 17 hours, dried in a vacuum oven at 110° C. for 17 hours and then dried in a vacuum oven under high vacuum at 125° C. for 48 hours to yield a product weighing 734.6 grams and melting in the range of 156° C. to 166° C. While drying at 125° C., the product partially melted. The product was analyzed for bromine and chlorine. Found: 57.29% Br, <0.01% Cl. Thermogravimetric analysis in a flowing nitrogen atmosphere at a heating rate of 10° C./minute indicated a 1 percent weight loss at 314° C. and a 5 percent weight loss at 385° C. By differential scanning calorimetry in a flowing nitrogen atmosphere at a heating rate of 10° C./minute, decomposition of the product began at about 350° C. Nuclear magnetic resonance spectroscopy and infrared spectroscopy confirmed the product as being an oligomeric carbonate. According to liquid chromatography, the number average molecular weight, the weight average molecular weight, and the z-average molecular weight of the product were 900, 1200, and 1594, respectively.

EXAMPLE VI

Using the general procedure of Example V, an oligomeric carbonate was prepared. The product melted in the range of 135° C. to 145° C. The product was analyzed for bromine. Found: 55.57% Br. Thermogravimetric analysis in a flowing nitrogen atmosphere at a heating rate of 10° C./minute indicated a 5 percent weight loss at 247° C., a 10 percent weight loss at 351° C., a 20 percent weight loss at 388° C., and a 40 percent weight loss at 411° C. By differential scanning calorimetry in a flowing nitrogen atmosphere at a heating rate of 10° C./minute, decomposition of the product began at greater than 310° C. According to liquid chromatography, the number average molecular weight, the weight average molecular weight, and the z-average molecular weight of the product were 1227, 1691, and 2279, respectively.

EXAMPLE VII

Using the general procedure of Example V, an oligomeric carbonate was prepared. The product melted in the range of 138° C. to 150° C. The product was analyzed for bromine. Found: 56.89% Br. Thermogravimetric analysis in a flowing nitrogen atmosphere at a heating rate of 10° C./minute indicated a 5 percent weight loss at 310° C., a 10 percent weight loss at 372°

C., a 20 percent weight loss at 398° C., and a 40 percent weight loss at 420° C. By differential scanning calorimetry in a flowing nitrogen atmosphere at a heating rate of 10° C./minute, decomposition of the product began at greater than 310° C. According to liquid chromatography, the number average molecular weight, the weight average molecular weight, and the z-average molecular weight were 1312, 1741, and 2302, respectively.

In Examples VIII–XI, a series of compositions, each containing an additive to be evaluated, antimony trioxide and polymer, were tested for fire retardance. For each of the compositions tested, polymer was introduced into a mixer and melted. A mixture of the additive to be evaluated and antimony trioxide was added to the melt and the material were mixed until uniform to produce the composition. After cooling, each composition was heat pressed into sheets which were cut into bars. The bars were tested for flammability in accordance with the procedure of Vertical Burning Test 94, dated Feb. 1, 1974, of Underwriters Laboratories, Inc., and in accordance with Standard Method of Test for flammability of Plastics Using the Oxygen Index Method, ASTM Standard Method D 2863-70, American Society for Testing and Materials. The polymers are abbreviated according to the following key:
ABS=acrylonitrile-butadiene-styrene graft polymer
HIPS=high impact polystyrene
PP=polypropylene
HDPE=high density polyethylene
PBT=glass filled poly(butylene terephthalate); 30% glass fibers, 70% resin, by weight.

EXAMPLE VIII

The additive to be evaluated was the product of Example III. The identities of the polymers, the proportions of materials and the results are shown in Table 1.

TABLE 1

| Polymer | Proportions parts by weight | | | Vertical Burning Test UL 94 | | ASTM Method D 2863-70 |
|---|---|---|---|---|---|---|
| | Polymer | Additive | Antimony Trioxide | Classification | After Flame Time, seconds | Oxygen Index, percent O$_2$ by volume |
| ABS | 100 | 15 | 5 | 94V-2 | 7.5 | 26.5 |
| HIPS | 100 | 12 | 4 | 94V-1 | 5.0 | 23.5 |
| HDPE | 100 | 10 | 5 | 94V-0 | 28.0 | 28.0 |
| PP | 100 | 5 | 2.5 | Fail | >30 | <23.0 |
| ABS | 79.4 | 17 | 3.6 | 94V-0 | 0.0 | 28.5 |

EXAMPLE IX

The additive to be evaluated was the product of Example V. The identities of the polymers, the proportions of materials and the results are shown in Table 2.

TABLE 2

| Polymer | Proportions parts by weight | | | Vertical Burning Test UL 94 | | ASTM Method D 2863-70 |
|---|---|---|---|---|---|---|
| | Polymer | Additive | Antimony Trioxide | Classification | After Flame Time, seconds | Oxygen Index, percent O$_2$ by volume |
| ABS | 100 | 15 | 5 | Fail | >30 | 24.5 |
| ABS | 100 | 24.2 | 4.6 | 94V-2 | 9.8 | 29.0 |
| HIPS | 100 | 12 | 4 | Fail | >30 | 23.5 |
| PP | 100 | 5 | 2.5 | Fail | >30 | <22.0 |
| HDPE | 100 | 8.74 | 2.91 | Fail | >30 | 25.0 |
| PBT | 100[1] | 12 | 3 | 94V-0 | 0.2 | 32.0 |

[1] 30 parts glass fibers and 70 parts resin.

EXAMPLE X

The additive to be evaluated was the product of Example VI. The identities of the polymers, the proportions of materials and the results are shown in Table 3.

TABLE 3

| Polymer | Proportions parts by weight | | | Vertical Burning Test UL 94 | | ASTM Method D 2863-70 |
|---|---|---|---|---|---|---|
| | Polymer | Additive | Antimony Trioxide | Classification | After Flame Time, seconds | Oxygen Index, percent O$_2$ by volume |
| HDPE | 100 | 8.7 | 2.9 | Fail | >30 | Not Tested |
| PBT | 100[2] | 12 | 3 | 94V-0 | 0.5 | Not Tested |

[2] 30 parts glass fibers and 70 parts resin.

EXAMPLE XI

The additive to be evaluated was the product of Example VII. The identities of the polymers, the proportions of materials and the results are shown in Table 4.

TABLE 4

| Polymer | Proportions parts by weight | | | Vertical Burning Test UL 94 | | ASTM Method D 2863-70 |
|---|---|---|---|---|---|---|
| | Polymer | Additive | Antimony Trioxide | Classification | After Flame Time, seconds | Oxygen Index, percent O$_2$ by volume |
| HDPE | 100 | 8.7 | 2.9 | Fail | >30 | Not Tested |
| PBT | 100[3] | 12 | 3 | 94V-0 | 0.3 | Not Tested |

[3] 30 parts glass fibers and 70 parts resin.

In Examples XII and XIII, a series of compositions, each containing an additive to be evaluated, antimony trioxide and polymer, were tested for fire retardance. For each of the compositions tested, polymer was introduced into a mixer and melted. A mixture of the additive to be evaluated and antimony trioxide was added to the melt and the materials were mixed until uniform to produce the composition. After cooling, each composition was chopped into small pieces and extruded into one-eighth inch (3.175 mm) pellets. The pellets were injection molded into bars. The bars were tested for flammability in accordance with the procedure of Vertical Burning Test 94, dated Feb. 1, 1974, of Underwriters Laboratories, Inc. The polymers are abbreviated according to the key given previously.

EXAMPLE XII

The additive to be evaluated was the product of Example IV and the polymer was ABS. The oxygen index was not determined. The proportions of materials and the results are shown in Table 5.

TABLE 5

| Proportions, parts by weight | | | Vertical Burning Test UL 94 | |
|---|---|---|---|---|
| Polymer | Additive | Antimony Trioxide | Classification | After Flame Time, seconds |
| 100 | 11 | 11 | Fail | >30 |
| 100 | 14.7 | 7.3 | 94V-2 | 8.6 |
| 100 | 16.5 | 5.5 | 94V-2 | 6.8 |
| 100 | 17.6 | 4.4 | 94V-2 | 6.2 |
| 100 | 18.3 | 3.7 | 94V-2 | 5.0 |
| 100 | 18.9 | 3.1 | 94V-2 | 4.9 |
| 100 | 18.75 | 6.25 | 94V-2 | 3.1 |
| 100 | 20 | 5 | 94V-2 | 5.5 |
| 100 | 20.8 | 4.2 | 94V-2 | 4.7 |
| 100 | 21.4 | 3.6 | 94V-2 | 4.9 |
| 100 | 21.9 | 3.1 | 94V-2 | 5.3 |
| 100 | 22.2 | 2.8 | 94V-2 | 4.4 |
| 100 | 18.7 | 9.3 | 94V-2 | 6.5 |
| 100 | 21 | 7 | 94V-2 | 4.6 |
| 100 | 22.4 | 5.6 | 94V-2 | 3.5 |
| 100 | 23.3 | 4.7 | 94V-2 | 3.9 |
| 100 | 24 | 4 | 94V-2 | 7.0 |
| 100 | 24.5 | 3.5 | 94V-2 | 5.8 |
| 100 | 20.7 | 10.3 | 94V-0 | 0.5 |
| 100 | 23.25 | 7.75 | 94V-0 | 0.1 |
| 100 | 24.8 | 6.2 | 94V-2 | 6.2 |
| 100 | 25.8 | 5.2 | 94V-2 | 5.8 |

EXAMPLE XIII

The additive to be evaluated was the product of Example IV and the polymer was HDPE. The oxygen index was not determined. The proportions of materials and the results are shown in Table 6.

TABLE 6

| Proportions, parts by weight | | | Vertical Burning Test UL 94 | |
|---|---|---|---|---|
| Polymer | Additive | Antimony Trioxide | Classification | After Flame Time, seconds |
| 100 | 5.3 | 2.7 | Fail | >30 |
| 100 | 6 | 2 | 94V-2 | 8.1 |
| 100 | 6.4 | 1.6 | 94V-2 | 9.9 |
| 100 | 6.7 | 1.3 | Fail | >30 |
| 100 | 6.7 | 3.3 | 94V-2 | 2.6 |
| 100 | 7.5 | 2.5 | 94V-2 | 2.0 |
| 100 | 8 | 2 | 94V-2 | 1.3 |
| 100 | 8.3 | 1.7 | 94V-2 | 8.1 |
| 100 | 8 | 4 | 94V-2 | 1.2 |
| 100 | 9 | 3 | 94V-2 | 0.9 |
| 100 | 9.6 | 2.4 | 94V-2 | 0.6 |
| 100 | 10 | 2 | 94V-2 | 1.1 |

EXAMPLE XIV

A composition containing 100 parts of ABS polymer, 23.25 parts of the product of Example III, and 7.75 parts of antimony trioxide was tested for physical properties. The ABS polymer without either of the additives was also tested for physical properties. The results are shown in Table 7.

TABLE 7

| Test | ABS With Additives | ABS Without Additive |
|---|---|---|
| Tensile Strength, megapascals | 41.437 | 39.714 |
| Tensile Modulus, megapascals | 364.043 | 335.085 |
| Flexural Strength, megapascals | 82.737 | 76.532 |
| Flexural Modulus, megapascals | 2626.902 | 2351.112 |
| Notched Izod Impact Strength, newton-meters/meter | 73.663 | 422.759 |

TABLE 7-continued

| Test | ABS With Additives | ABS Without Additive |
|---|---|---|
| Heat Distortion Temperature, °C. | 71 | 73 |
| Specific Gravity | 1.24 | Not Tested |
| Melt Index, grams/10 minutes | 1.56 | 0.66 |

EXAMPLE XV

A composition containing 100 parts of HDPE polymer, 9.6 parts of the product of Example III, and 2.4 parts of antimony trioxide was tested for physical properties. The HDPE polymer without either of the additives was also tested for physical properties. The results are shown in Table 8.

TABLE 8

| Test | HDPE With Additives | HDPE Without Additives |
|---|---|---|
| Tensile Strength, megapascals | 17.375 | 19.788 |
| Tensile Modulus megapascals | 167.543 | 257.174 |
| Flexural Strength, megapascals | 26.821 | 28.062 |
| Flexural Modulus, megapascals | 910.108 | 944.582 |
| Notched Izod Impact Strength, newton-meters/meter | 22.953 | 34.162 |
| Heat Distortion Temperature, °C. | 53 | 47 |
| Specific Gravity | 1.03 | Not Tested |
| Melt Index, grams/10 minutes | 14.37 | 14.32 |

EXAMPLE XVI

A composition containing 100 parts of PBT (30 parts glass fibers and 70 parts resin), 12 parts of the product of Example V, and 3 parts of antimony trioxide was tested for physical properties. The PBT without either of the additives was also tested for physical properties. The results are shown in Table 9.

TABLE 9

| Test | PBT With Additives | PBT Without Additives |
|---|---|---|
| Tensile Strength, megapascals | 79.221 | 70.189 |
| Tensile Modulus, megapascals | 4240.276 | 4095.486 |
| Flexural Strength, megapascals | 147.617 | 135.068 |
| Flexural Modulus, megapascals | 6391.440 | 6026.018 |
| Notched Izod Impact Strength, newton-meters/meter | 40.034 | 44.304 |
| Specific Gravity | 1.61 | 1.52 |

Although the present invention has been described with reference to specific details of certain embodiments thereof, it is not intended that such details should be regarded as limitations upon the scope of the invention except insofar as they are included in the accompanying claims.

I claim:

1. Carbonate polymer diagrammatically represented by the formula

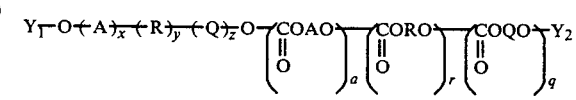

wherein
a. each A is (1-methylethylidene)bis(2,6-dibromo-4,1-phenylene),
b. each R is 1,2-ethanediyl, c. each Q is individually a divalent organo group, other than A or R, having at least two carbon atoms between the two valences thereof,
d. $Y_1$ of each molecule of the carbonate polymer is independently hydrogen or

where $Y_3$ is a monovalent organo group,
e. $Y_2$ of each molecule of the carbonate polymer is independently hydrogen or

where $Y_4$ is a monovalent organo group,
f. the average value of each of x, y and z is in the range of from 0 to 1,
g. the sum of the average values of a and x is in the range of from 2 to about 8,
h. the sum of the average values of r and y is in the range of from 1 to about 8,
i. the sum of the average values of q and z is in the range of from 0 to about 8,
provided that
j. the sum of the average values of x, y and z is 1,
k. the sum of the average values of a and x is greater than the sum of the average values of r and y, and
l. the sum of the average values of a and x is greater than or equal to the sum of the average values of q and z.

2. The carbonate polymer of claim 1 wherein $Y_1$ and $Y_2$ are each hydrogen.

3. The carbonate polymer of claim 1 wherein
a. $Y_1$ is

where $Y_3$ is a monovalent organo group, and
b. $Y_2$ is

where $Y_4$ is a monovalent organo group.

4. The carbonate polymer of claim 3 wherein $Y_3$ and $Y_4$ are each independently alkyl, alpha,beta-unsaturated alkenyl, aralkyl, (cycloalkyl)alkyl, cycloalkyl, aryl, alkoxyalkyl or aryloxyalkyl, which may be unsubstituted or substituted.

5. The carbonate polymer of claim 3 wherein $Y_3$ and $Y_4$ are either both pentabromophenyl or both 2,4,6-tribromophenyl.

6. The carbonate polymer of claim 1 wherein
a. the sum of the average values of a and x is in the range of from 2 to about 6,
b. the sum of the average values of r and y is in the range of from 1 to about 6, and
c. the sum of the average values of q and z is in the range of from 0 to about 6.

7. The carbonate polymer of claim 6 wherein the sum of the average values of q and z is essentially zero.

8. The carbonate polymer of claim 1 having a number average molecular weight in the range of from about 650 to about 30,000.

9. The carbonate polymer of claim 1 having a number average molecular weight in the range of from about 766 to about 8000.

10. The carbonate polymer of claim 1 wherein
a. $Y_1$ is

where $Y_3$ is pentabromophenyl,
b. $Y_2$ is

where $Y_4$ is pentabromophenyl, and
c. the sum of the average values of q and z is essentially zero.

11. The carbonate polymer of claim 1 wherein
a. $Y_1$ is

where $Y_3$ is 2,4,6-tribromophenyl,
b. $Y_2$ is

where $Y_4$ is 2,4,6-tribromophenyl, and
c. the sum of the average values of q and z is essentially zero.

12. A composition of matter comprising carbonate polymer diagrammatically represented by the formula

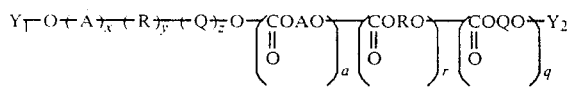

wherein
a. each A is (1-methylethylidene)bis(2,6-dibromo-4,1-phenylene),
b. each R is 1,2-ethanediyl,
c. each Q is individually a divalent organo group, other than A or R, having at least two carbon atoms between the two valences thereof,
d. $Y_1$ of each molecule of the carbonate polymer is independently hydrogen or

where $Y_3$ is a monovalent organo group,
e. $Y_2$ of each molecule of the carbonate polymer is independently hydrogen or $$-\underset{\underset{O}{\parallel}}{C}OY_4$$

where $Y_4$ is a monovalent organo group,
f. the average value of each x, y and z is in the range of from 0 to 1,
g. the sum of the average values of a and x is in the range of from 2 to about 8,
h. the sum of the average values of r and y is in the range of from 1 to about 8,
i. the sum of the average values of q and z is in the range of from 0 to about 8,
provided that
j. the sum of the average values of x, y and z is 1,
k. the sum of the average values of a and x is greater than the sum of the average values of r and y, and
l. the sum of the average values of a and x is greater than or equal to the sum of the average values of q and z in admixture with other polymers.

13. The composition of claim 12 wherein said other polymer comprises acrylonitrile-butadiene-styrene interpolymer, acrylonitrile-butadiene-styrene graft polymer, polystyrene, high density polyethylene, low density polyethylene, polypropylene, polyester or polycarbonate.

14. The composition of claim 12 wherein said carbonate polymer is present in an amount in the range of from about 2 percent to about 30 percent by weight of the total polymeric content of said composition.

15. The composition of claim 12 further comprising antimony trioxide.

16. The composition of claim 12 wherein
a. $Y_1$ is $$Y_3O\underset{\underset{O}{\parallel}}{C}-$$

where $Y_3$ is pentabromophenyl,
b. $Y_2$ is $$-\underset{\underset{O}{\parallel}}{C}OY_4$$

where $Y_4$ is pentabromophenyl, and
c. the sum of the average values of q and z is essentially zero.

17. The composition of claim 12 wherein
a. $Y_1$ is $$Y_3O\underset{\underset{O}{\parallel}}{C}-$$

where $Y_3$ is 2,4,6-tribromophenyl,
b. $Y_2$ is $$-\underset{\underset{O}{\parallel}}{C}OY_4$$

where $Y_4$ is 2,4,6-tribromophenyl, and
c. the sum of the average values of q and z is essentially zero.

* * * * *